W. P. WHITLEY.
LACING TOOL.
APPLICATION FILED OCT. 15, 1920.
1,406,793.
Patented Feb. 14, 1922.
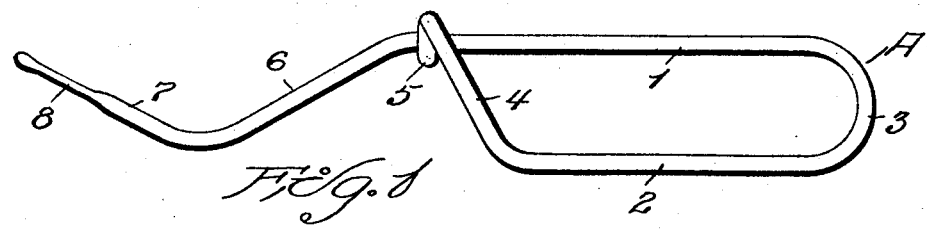
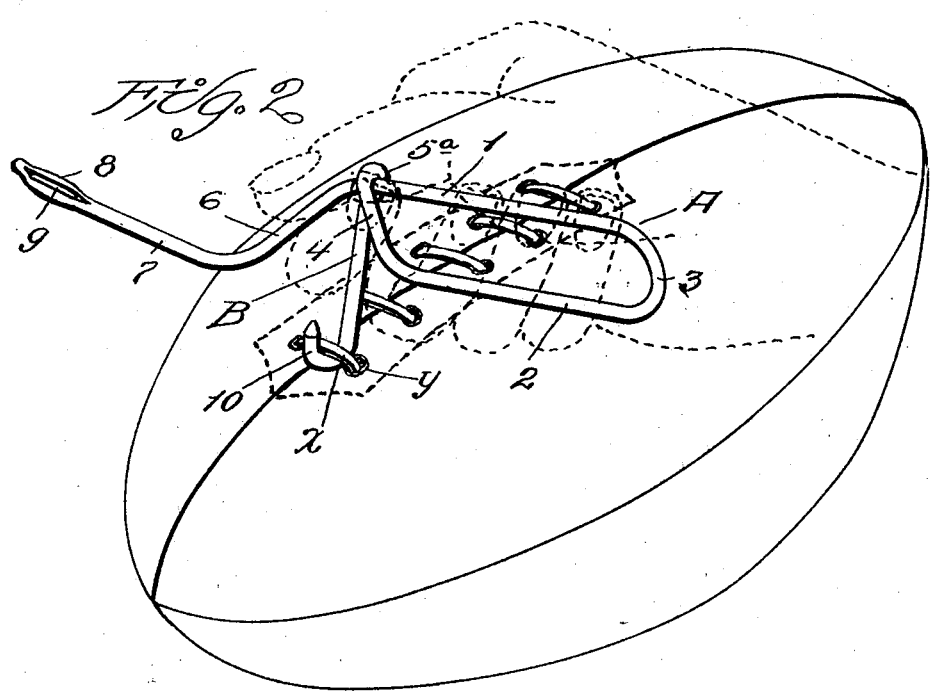
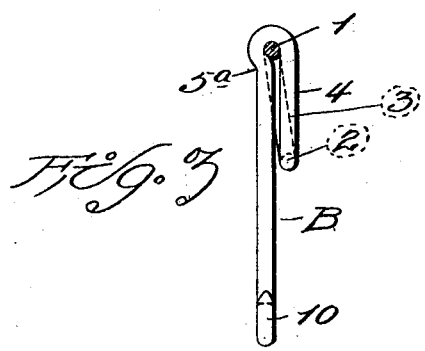
INVENTOR
WILLIAM P. WHITLEY,
by Bakewell & Church ATTORNEYS.

UNITED STATES PATENT OFFICE.

WILLIAM P. WHITLEY, OF ST. LOUIS, MISSOURI, ASSIGNOR TO RAWLINGS MFG. CO., OF ST. LOUIS, MISSOURI, A CORPORATION OF MISSOURI.

LACING TOOL.

1,406,793.    Specification of Letters Patent.    Patented Feb. 14, 1922.

Application filed October 15, 1920. Serial No. 417,163.

*To all whom it may concern:*

Be it known that I, WILLIAM P. WHITLEY, a citizen of the United States, residing at St. Louis, Missouri, have invented a certain new and useful Improvement in Lacing Tools, of which the following is a full, clear, and exact description, such as will enable others skilled in the art to which it appertains to make and use the same.

This invention relates to lacing tools, namely, devices of the kind that are used for inserting a lace in holes formed in two parts or members that are adapted to be drawn together by the lace.

One object of my invention is to provide an inexpensive lacing tool of simple design and rugged construction that is particularly adapted for use in lacing a foot ball, basket ball or similar object.

Another object is to provide a lacing tool that is equipped with a device for tightening a lace or drawing it taut after the lace has been inserted in the two parts, or members which are secured together by the lace.

Figure 1 of the drawings is a side elevational view, illustrating one form of my invention.

Figure 2 is a perspective view, illustrating the preferred form of my invention and showing how the tool is used to tighten the lace of a foot ball or similar object; and Figure 3 is a transverse sectional view of the tool shown in Figure 2, so as to show how the tightening device is integrally connected to the handle portion of the tool, the shank of the tool being shown in section and the tightening device in end elevation.

Referring to the drawings which illustrate the preferred form of my invention, A designates the handle of the tool which is formed from a piece of heavy wire bent to produce two parallel portions 1 and 2 integrally connected together at one end by a curved portion 3 and joined together at their opposite ends by an upwardly bent part 4 on the bottom portion 2 whose terminal is wrapped around or bent over the top portion 1, as indicated at 5. The portion 1 of the handle A extends forwardly beyond the point 5 where the two parallel portions 1 and 2 of the handle are connected together so as to form a shank that comprises a downwardly inclined portion 6 and an upwardly inclined portion 7. Said shank is provided adjacent its end with a flat portion 8 in which an eye 9 is formed, as shown in Figure 2. In using the tool for inserting the lace *x* in the cover of a foot ball or similar object the portion 7 of the shank of the tool is passed through oppositely-disposed holes *y* in the cover of the ball, the lace *x* is then inserted in the eye 9 of the tool and the tool is then moved rearwardly so as to withdraw the inclined portion 7 of the shank from the holes *y*, thus causing the lace *x* to be drawn through said holes. The above operations are repeated to insert the lace in the remaining pairs of oppositely-disposed holes *y* in the cover of the ball.

During the operation of drawing the lace through the holes in the cover of the ball the handle A of the tool is subjected to considerable strain in a direction tending to separate it from the shank of the tool, but in view of the fact that the handle and the shank of the tool are integrally connected together, it is impossible for the handle to pull off, as so often occurs with lacing tools of the kind heretofore in use. Furthermore, as the handle of the tool is of loop form, the user can obtain a firm grip on the handle during the operation of inserting the shank in the holes of the cover and in drawing the lace through the holes. As the complete tool is made from a piece of heavy wire, the tool can be manufactured at a very low cost.

In Figure 2 of the drawings I have illustrated a tool that differs from the tool shown in Figure 1, in that it is provided with a device B for tightening the lace *x* or drawing said lace taut after said lace has been inserted in the holes in the cover of the ball. Said device B preferably consists of a hook arranged at the front end of the handle and disposed at approximately right angles to the handle. To tighten the lace the user grasps the handle of the tool in the manner shown in dotted lines in Figure 2, then inserts the hook 10 of the device B in one loop of the lace *x* and thereafter bodily moves the tool upwardly so as to draw the lace taut, and thus cause the lace to close up or draw together the two portions of the cover of the ball in which the holes *y* are formed. Preferably, the tightening device B of the tool is formed by an extension on the upwardly inclined part 4 at the front end of the handle A that is bent around the top portion 1 of the handle and crimped at 5ª, as shown in Figure 3, and then bent downwardly into a position at substantially right angles to the two parallel portions 1 and 2 of the handle, the terminal of said downwardly-projecting portion being bent to form the hook 10.

Having thus described my invention, what I claim as new and desire to secure by Letters Patent, is:

1. A lacing tool formed from a single length of wire having one end portion rebent to form parallel hand-engaging portions, the other end portion extending downwardly, from said hand-engaging portions and terminating in an upwardly extending lace-engaging portion.

2. A lacing tool formed from a single length of wire having one end portion rebent to form parallel hand-engaging portions, one end portion extending downwardly and forwardly from said hand-engaging portions and thence terminating in an upwardly and forwardly extending portion having a lace-receiving eye formed therein.

WILLIAM P. WHITLEY.